(12) United States Patent
Wetsch et al.

(10) Patent No.: US 8,454,779 B2
(45) Date of Patent: *Jun. 4, 2013

(54) INFLATION AND SEALING DEVICE FOR INFLATABLE AIR CUSHIONS

(75) Inventors: Thomas D. Wetsch, St. Charles, IL (US); Paul A. Selle, Appleton, WI (US); Mitchell J. Hein, Green Bay, WI (US)

(73) Assignee: Pregis Innovative Packaging, Inc., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,147

(22) Filed: Mar. 5, 2012

(65) Prior Publication Data

US 2012/0227892 A1 Sep. 13, 2012

Related U.S. Application Data

(63) Continuation of application No. 11/858,550, filed on Sep. 20, 2007, now Pat. No. 8,128,770.

(60) Provisional application No. 60/846,188, filed on Sep. 20, 2006.

(51) Int. Cl.
*B29C 65/02* (2006.01)
*B65B 3/02* (2006.01)

(52) U.S. Cl.
USPC .......... 156/147; 156/494; 156/495; 156/496; 156/536; 53/79; 53/403; 53/558; 53/562; 53/563; 53/568

(58) Field of Classification Search
USPC .............. 156/147, 494–496; 53/79, 403, 558, 53/562, 563, 568
See application file for complete search history.

(56) References Cited

U.S. PATENT DOCUMENTS

| | | | |
|---|---|---|---|
| 3,660,189 A | 5/1972 | Troy | |
| 3,868,285 A | 2/1975 | Troy | |
| 4,017,351 A | 4/1977 | Larson et al. | |
| 6,209,286 B1 | 4/2001 | Perkins et al. | |
| 6,460,313 B1 | 10/2002 | Cooper | |
| 6,635,145 B2 | 10/2003 | Cooper | |
| 7,059,097 B2 | 6/2006 | Perkins et al. | |
| 7,185,474 B2 | 3/2007 | Perkins et al. | |
| 7,328,541 B2 | 2/2008 | Garceau et al. | |
| 8,128,770 B2 * | 3/2012 | Wetsch et al. ................. | 156/147 |
| 2004/0206050 A1 | 10/2004 | Fuss et al. | |
| 2006/0011291 A1 | 1/2006 | O'Dowd | |
| 2006/0292320 A1 | 12/2006 | Greenwood et al. | |

FOREIGN PATENT DOCUMENTS

EP 1280651 2/2003

* cited by examiner

*Primary Examiner* — Katarzyna Wyrozebski Lee
*Assistant Examiner* — Daniel Lee
(74) *Attorney, Agent, or Firm* — Dorsey & Whitney LLP

(57) ABSTRACT

The invention is directed to a device for inflating and sealing an inflatable structure, such as inflatable cushions. The device includes an assembly configured for inflating a cushion cavity disposed between first and second layers of a film, and a sealing mechanism that preferably includes a rotary sealing drum, which can include a heat source.

25 Claims, 8 Drawing Sheets

INFLATION AND SEALING DEVICE FOR INFLATABLE AIR CUSHIONS

CROSS-REFERENCE TO RELATED APPLICATION

This application is a continuation of U.S. patent application Ser. No. 11/858,550 filed Sep. 20, 2007, now U.S. Pat. No. 8,128,770, which claims the benefit of provisional application No. 60/846,188, filed on Sep. 20, 2006, the contents of which are hereby incorporated herein by reference thereto.

FIELD OF THE INVENTION

The present invention relates to the manufacturing of packaging materials, and more particularly to a device for inflating and sealing inflatable air cushions that are used as packaging materials. This application claims the benefit of provisional application No. 60/813,363, filed on Jun. 14, 2006, and is a continuation of the International PCT Application entitled Vehicle Propulsion System Activation Device, filed on Jun. 12, 2007, the contents of which are hereby incorporated herein by reference thereto.

BACKGROUND OF THE PRESENT INVENTION

Devices are known for inflating flexible structures, such as inflatable air cushions or pillows (hereinafter referred to as "cushions") that are used to provide added protection to an object during packaging and transportation of fragile articles. It is desirable that devices for manufacturing such inflatable cushions be compact, reliable, and easy to operate. Additionally, it is desirable that the inflatable cushions themselves be quickly manufactured and adequately inflated and sealed to reduce the likelihood of leaking, and thus loss of their protective properties.

One example of a such a device is disclosed in U.S. Pat. No. 6,209,286 to Perkins et al. The device is a continuous motion device that uses drive rollers to advance preformed sheet material through the device. The device includes a pair of idler rollers that are crowned in the center for keeping the central section of the sheet material laterally taut to prevent bunching up of the material at the drive rollers. The device seals the sheet material after inflation by moving the material past a seal forming apparatus where heat and light pressure are linearly applied to contact the upper surface of the sheet material and form a seal therein.

Thus, there is a need for a device for adequately inflating and sealing inflatable, flexible structures, such as air-filled cushions, with increased speed and reliability.

SUMMARY OF THE INVENTION

The present invention is directed to a device for inflating and sealing an inflatable, flexible structure. In the preferred embodiment, the inflatable-cushion inflation and sealing device includes an inflation assembly configured for inflating with a fluid a cushion cavity disposed between first and second layers of a film, and a sealing mechanism that includes a rotary sealing drum, which includes a heat source and has a periphery. The sealing mechanism is configured for receiving overlapping edge portions of the first and second film layers adjacent the inflated cushion cavity, and directing the edge portions about the sealing drum to hold the edge portions against each other sufficiently tightly to keep the fluid from escaping from between the edge portions. The sealing mechanism is also configured to seal the edge portions to each other using the heat source over a heating portion of the sealing drum periphery that is at least about 40% of the periphery to form a longitudinal seal configured to seal the fluid in the cushion cavity.

Preferably, the heat source is configured to provide heat sufficient to seal the edge portions along the entire heating portion. The sealing mechanism preferably includes at least one belt in tension around the sealing drum to press the edge portions against the sealing drum and each other for longitudinally sealing the edge portions. The sealing mechanism is also preferably configured for sealing the film at a rate of at least 70 ft/min. Also, the rotary sealing drum preferably includes a circumferential outer surface that is substantially smooth.

In one embodiment, the film has a major surface extending longitudinally and transversely to an inflation path, the edge portions are joined together, the inflation assembly comprises a fluid conduit configured for reception longitudinally between the joined edge portions, and the device further comprises a cutter configured and oriented to cut the edge portions apart from each other at a location about the fluid conduit disposed at less than about 90° from a direction orthogonal to the major surface of the film. Preferably, the cutter includes a blade. The film is preferably pulled in a direction that is away from the major surface of the film after cutting so that the film is pulled against the cutter during cutting.

In another embodiment, the device further includes first and second tension rollers disposed on a transversely opposite side of the film from the edge portions and configured for gripping an opposite edge of the film. The tension rollers are oriented at an angle to a direction transverse to the inflation path to bias said opposite edge away from the edge portions to improve airflow into the cushion cavity.

In another preferred embodiment, the sealing drum is also configured to seal the edge portions to each other using the heat source to form a longitudinal seal configured to seal the fluid in the cushion cavity, wherein the heat source is configured to provide substantially continuous heat sufficient to seal the edge portions.

In yet another preferred embodiment, the sealing mechanism includes first and second belts configured and disposed for nipping there between overlapping edge portions of the first and second film layers adjacent the inflated cushion cavity the edge portions to keep the fluid from escaping from between the edge portions. The belts are also configured for directing the edge portions about a curved path, and a heating element is disposed along a curved portion of the curved path and is operable to heat the edge portions sufficiently to seal the edge portions for sealing the fluid in the cushion cavity.

The sealing drum of the device can include the heating element, and the first and second belts are configured for directing the edge portions about the sealing drum to hold the edge portions against each other sufficiently tightly to keep the fluid from escaping from between the edge portions, and for sealing the edge portions to each other. In an alternative embodiment, a heating element, such as a heating block with a concave surface, can hold the belts against the drum to provide the heat. Preferably, the sealing drum has a belt supporting portion and sealing portion that is configured for longitudinally heat sealing the edge portions together. The first belt is preferably disposed between the second belt and the belt supporting portion, and has a first width transverse to the path, and the second belt has a second width transverse to the path and wider than the first width. The second belt is preferably disposed to pinch a pinched part of the edge portion against the first belt and to pinch a sealed part of the edge portion against the sealing portion of the sealing drum. Preferably, the pinched part of the edge portion is disposed transversely between the longitudinally sealed part of the edge portion and the cushion cavity.

The sealing mechanism can also include a plurality of rollers configured for maintaining the first and second belts in tension sufficient to hold the edge portions against each other to keep the fluid from escaping from therebetween. The rollers also direct the belts about the sealing drum. In another embodiment, the first and second belts are configured such that the path includes a sealing segment and a cooling segment. In the sealing segment, the belts preferably hold the edge portions against the sealing drum to seal the edge portions, and in the cooling segment, located downstream of the sealing segment, the belts direct the sealed edge portions away from the sealing drum to allow the edge portions to cool. The belts preferably pinch the edge portions together to keep the fluid from escaping from the cushion cavity in each of the sealing and cooling segments. More preferably, the belts are configured such that the path includes an intake segment upstream from the sealing segment, in which the belts pinch the edge portions in an unsealed state to keep the fluid from escaping from the cushion cavity. Preferably, the path is curved along each of the intake, sealing, and cooling segments.

In another embodiment, the belts are configured such that the path includes an intake segment, in which the belts pinch the edge portions in an unsealed state to keep the fluid from escaping from the cushion cavity, and a sealing segment, located downstream of the intake segment, in which the belts hold the edge portions against the sealing drum to seal the edge portions. Preferably, the belts pinch the edge portions together to keep the fluid from escaping from the cushion cavity in each of the intake and sealing segments, and the device further includes a cutter configured and disposed for cutting the edge portions from each other in the intake segment after the first and second belts nip the edge portions therebetween.

In yet another preferred embodiment, the device includes an inflation assembly configured for inflating with a fluid a cushion cavity that is disposed between first and second layers of a film, a sealing mechanism configured for nipping overlapping edge portions of the first and second film layers adjacent the inflated cushion cavity and forming a longitudinal seal between the film layers, and a cutter disposed upstream of the sealing mechanism and configured for cutting the edge portions from each other after nipping, but prior to sealing. Preferably, the sealing mechanism is configured for moving the edge portions along a sealing path that includes an intake segment and a sealing segment. The sealing mechanism is also configured for holding the edge portions against each other in an unsealed state in the intake segment to keep the fluid therebetween prior to the sealing thereof, wherein the sealing mechanism is configured for sealing the edge portions together in the sealing segment, which is downstream from the intake segment; and the cutter is disposed along the intake segment.

In yet another preferred embodiment, the inflation and sealing device includes an inflation assembly configured for inflating with a fluid a cushion cavity disposed between first and second layers of a film, a sealing mechanism configured for sealing overlapping edge portions of the first and second film layers adjacent the inflated cushion cavity; and a tension member disposed on a transversely opposite side of the film from the edge portions and configured for gripping an opposite edge of the film to bias said opposite edge away from the edge portions to improve airflow into the cushion cavity. Preferably, the tension member includes first and second tension rollers oriented at an angle to a direction transverse to the inflation path to bias said opposite edge away from the edge portions.

The present invention is also directed to a method of inflating and sealing an inflatable cushion, a preferred embodiment including inflating a cushion cavity with a fluid, the cavity being disposed between first and second layers of a film. The method also includes directing overlapping edge portions of the first and second film layers adjacent the inflated cushion cavity about a rotary sealing drum to hold the edge portions against each other sufficiently tightly to keep the fluid from escaping from between the edge portions, and using a heat source over a heating portion of a sealing drum periphery that is at least about 40% of the periphery to form a longitudinal seal configured to seal the fluid in the cushion cavity.

The present invention thus provides a device for inflating and sealing cushions at relatively high speed and with increased reliability.

DETAILED DESCRIPTION OF THE PREFERRED EMBODIMENTS

The present invention is directed to a device for inflating and sealing inflatable, flexible structures. A variety of suitable inflatable structures or cushions are well known and used for protective packaging applications. Several preferred film structures are disclosed in U.S. application Ser. No. 11/123,090, which form inflatable cushions with longitudinal axes that can be, for instance, oriented longitudinally, transversely, or in any other pattern with respect to the longitudinal axis of the film.

Figure 1:
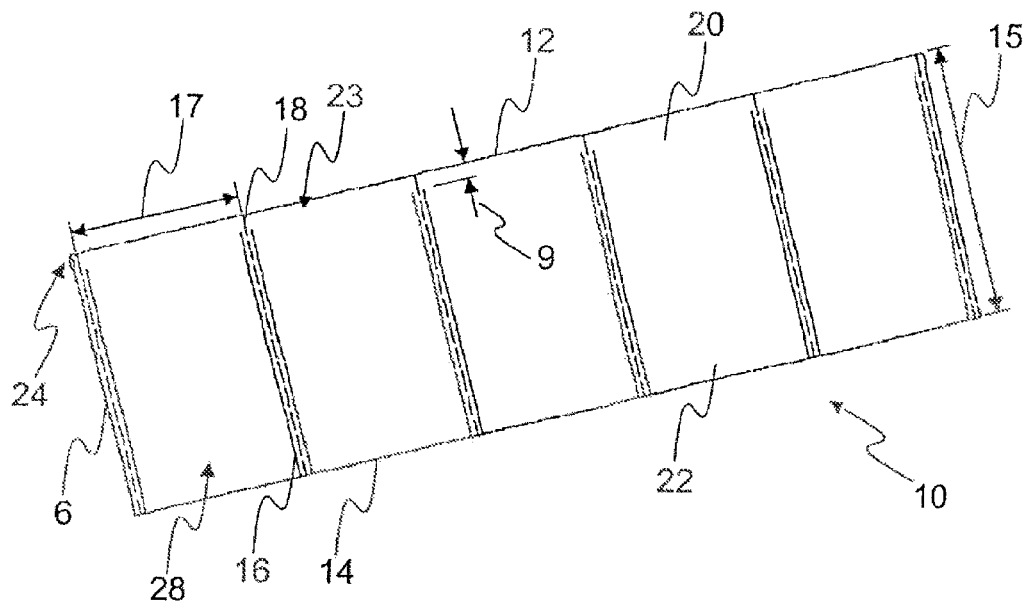
FIG. 1 is a perspective view of another preferred embodiment of a film of uninflated cushions that can be inflated and sealed by a device constructed according to the present invention.
Figure 2:
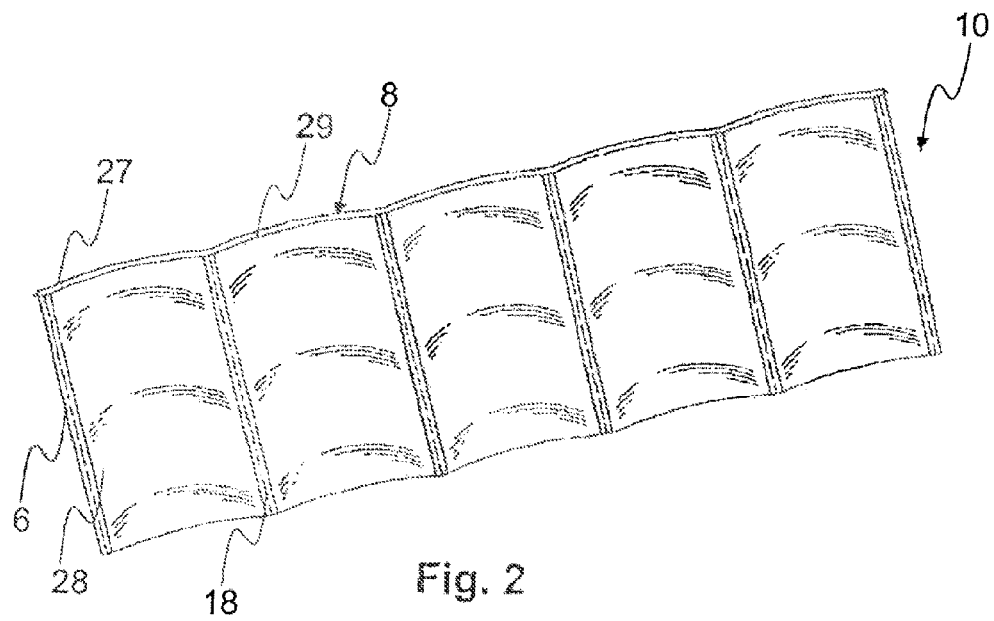
FIG. 2 is a perspective view of a preferred embodiment of a film of cushions after inflation and sealing by a device of the present invention.

A preferred embodiment of a film for inflatable cushions that is suitable for use with the device of the present invention is shown in FIG. 1. Film 10 of uninflated material has a series of transversely-oriented cushions attached at perforated edges, as shown in FIG. 2. The film 10 may be made of a variety of different materials, including materials such as polyethylenic resins such as low density polyethylene (LDPE), linear low density polyethylene (LLDPE), and high density polyethylene (HDPE); metallocenes; and ethylene vinyl acetates (EVA); and blends thereof.

The film 10 has a first longitudinal edge 12 and a second longitudinal edge 14, both of which are preferably closed or joined. The film 10 has a lead end 6, and also includes generally transverse seals 16 and perforations 18. The transverse seals 16 join a first film layer 20, such as a top layer, of the film 10 to a second film layer 22, such as a bottom layer, of the film 10 along the seals, and together with the closed, second longitudinal edge 14, define an inflation cavity of each cushion 28. The first and second film layers 20,22 define a major surface or plane of the film 10. The transverse perforations 18 perforate the film 10 through the first and second film layers 20,22 to facilitate later separation of each cushion 28 from each other.

In the embodiment shown in FIG. 1, the transverse seals 16 begin at the second longitudinal edge 14 of the film 10, and extend transversely to a distance 9 from the first longitudinal edge 12. The distance 9 is preferably at least about 0.25 inches and at most 1.0 inches, and more preferably at least about 0.30 inches and at most about 0.70 inches, though greater or smaller distances can be used in different embodiments. In the preferred embodiment, the distance 9 is from about 0.50 to about 0.60 inches.

Because the transverse seals 16 do not extend all the way to the first longitudinal edge 12 of the film 10, an opening 24 is defined between each end of a transverse seal 16 and the first longitudinal edge 12 of the film 10. The area of the film 10 between the openings 24, and between overlapping film layers adjacent the first longitudinal edge 12, defines a continuous, longitudinal inflation channel 23 having a width defined by distance 9. The lead opening 24 is generally used, to feed the inflation channel 23 of the film 10 over an inflation nozzle of an inflation device when loading the film to the device. The width of the inflation channel 23 is preferably configured to produce a tight, or in some embodiments a friction-fitting association, over the inflation nozzle to prevent or substantially reduce air leakage during inflation. Advantageously, this reduces the amount of compressed air required for inflation, and minimizes the size of the compressor and power utility requirements of the inflation device.

In FIG. 2, each inflated cushion 28 is separated from a neighboring inflated cushion by a transverse perforation 18. As a remnant of the manufacturing process explained below, small cutaway flaps 27 are left on the inflated film 10 adjacent to the first longitudinal edge 12. The manufacturing process also forms a longitudinal seal 29 along a sealing or edge portion 8 of the inflated film 10 (defined by the overlapping edge portions of each film layer 20,22), so that each inflated cushion 28 is sealed closed, trapping the inflation fluid, which is preferably a gas and more preferably air, within the cushions. The longitudinal seal 29 is preferably substantially straight, but in other embodiments, the seal can have a curved, zig-zag, or other orientation.

The film 10 also has a width 15, and a perforation-to-perforation length 17, which may be altered depending on the particular type of cushion being manufactured. Preferably, the width 15 of the film 10 is at least about 6 inches and at most about 36 inches, more preferably is at least about 12 inches and at most about 24 inches, and in the preferred embodiment, the width 15 is about 18 inches, although other widths can be used. The perforation-to-perforation length 17 is preferably at least about 4 inches and at most about 24 inches, and is more preferably at least about 8 inches and at most about 12 inches, although other widths can be used.

In one embodiment, the first and second film layers 20,22 are attached to each other along the second longitudinal edge 14, but are unattached to each other along the first longitudinal edge 12, prior to inflation. Such a configuration can be formed from a single layer of film material, a flattened tube of film material with one edge slit open, or two separate layers of film material. For example, the first and second film layers 20,22 can include a single sheet of film material that is folded over itself to define the attached second longitudinal edge 14 (i.e., "c-fold film").

Figure 3:
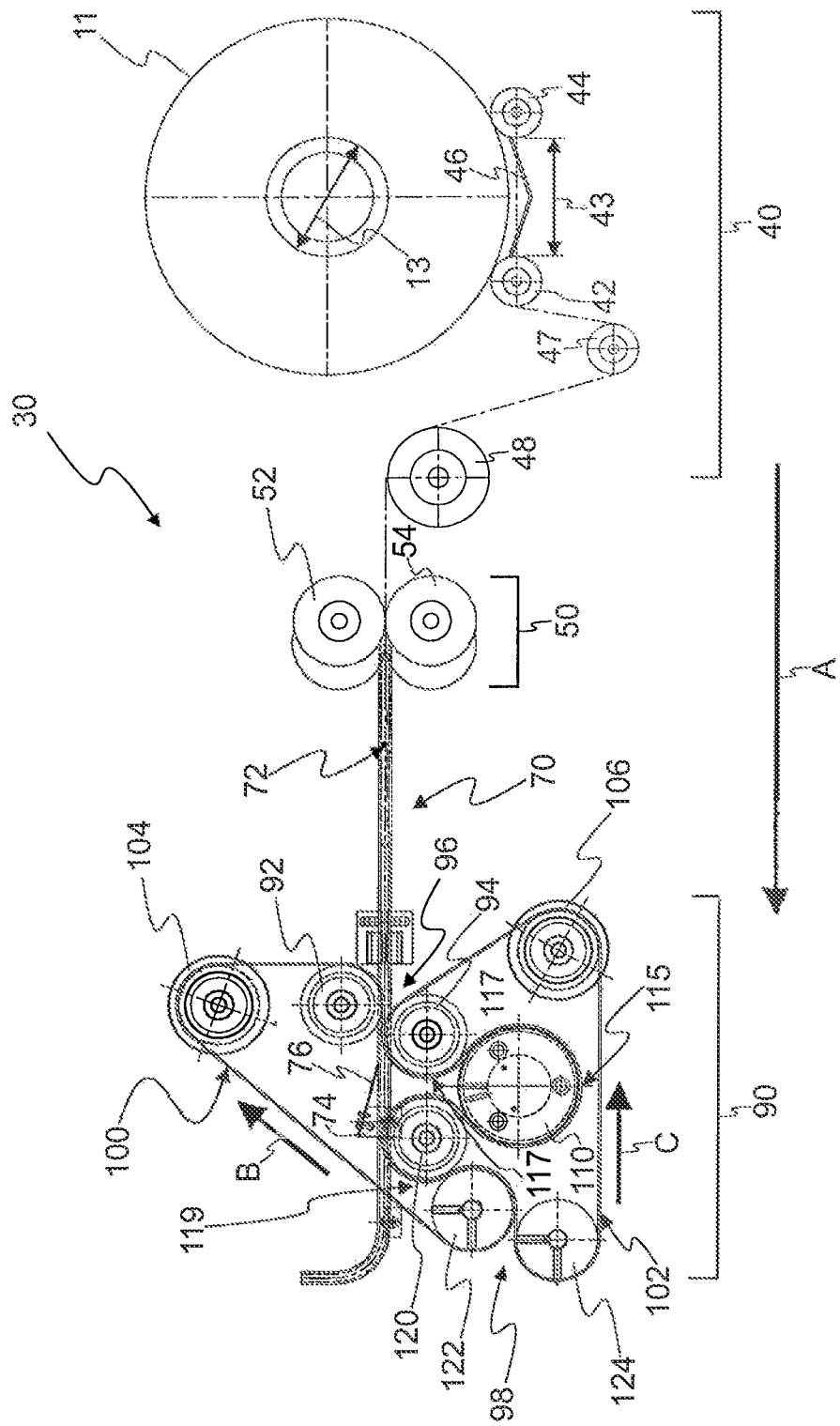
FIG. 3 is a schematic, side view of a preferred embodiment of an inflation and sealing device of the present invention.
Figure 4:
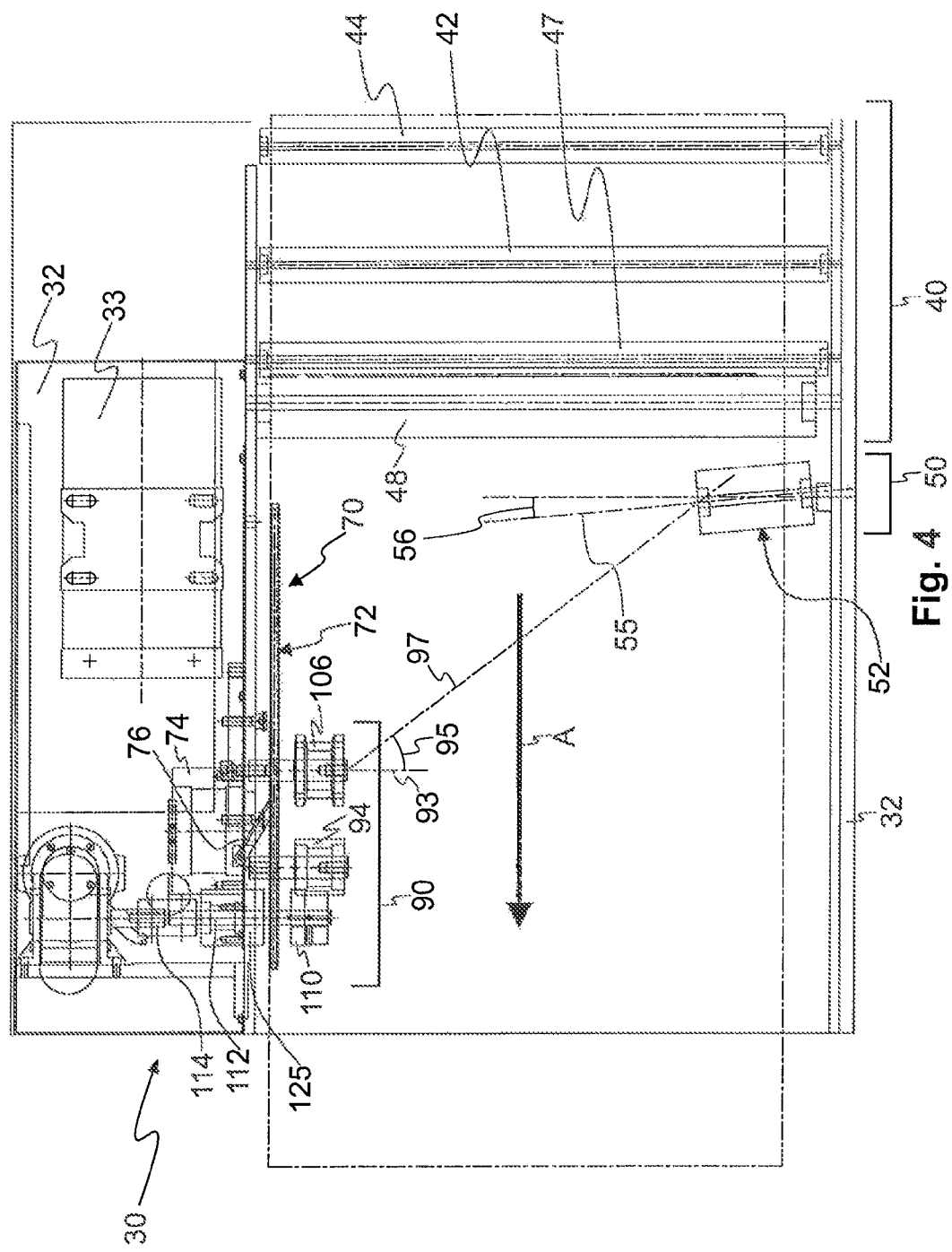
FIG. 4 is a schematic, top view thereof.

Referring to a preferred embodiment shown in FIGS. 3 and 4, the device 30 includes a device housing 32, a film staging mechanism 40, a feed-assisting mechanism 50, an inflation assembly 70, and a sealing mechanism 90. Although the device 30 can be used to inflate a variety of film structures having different configurations, the remaining sections of the application will describe the device with respect to inflation of the preferred film embodiment shown in FIG. 1.

The staging mechanism 40 is preferably configured for loading a bulk supply of film of uninflated cushions. As shown in FIG. 3, the uninflated film 10 is provided as a roll 11. Preferably, the staging mechanism 40 can accommodate rolls of film 11 that are at least about 9 inches in diameter, are more preferably at least about 12 inches in diameter, and are even more preferably at least about 18 inches in diameter. In the preferred embodiment shown in FIG. 3, the roll 11 has a diameter of 9 inches. In other embodiments, the staging mechanism can accommodate a roll of film with other dimensions, or a supply of film that is provided in other bulk forms, for example as a continuous stack of film material.

The staging mechanism 40 preferably includes a cradle that is formed by a pair of staging rollers 42,44 extending transversely from the housing 32 and spaced apart from each other, as shown in FIGS. 3 and 4. In this configuration, the staging rollers 42,44 can support the roll of film 11 therebetween. The spacing 43 between the staging rollers 42,44 can be adjustable or selected depending on the diameter of the roll 11 that is to be supported therebetween. Preferably, the spacing 43 is greater than the core diameter 13 of the roll 11. The staging mechanism 40 also preferably includes a tray 46 disposed between the staging rollers 42,44, and preferably also extending from the housing 32. The tray 46 preferably has a concave, bent, or v-shaped configuration, and is configured to catch or receive the core of the roll 11 once the film is removed or depleted therefrom. In other embodiments, the staging mechanism 40 can include a fixed roll axle or pin member configured for receiving and supporting the core of the roll thereon.

The staging mechanism 40 can also include other rollers, preferably also extending from the housing 32 and positioned between the staging rollers 42,44 and the feed-assisting mechanism 50, that are configured for directing the film from the staging mechanism 40 to the feed-assisting mechanism 50. The film 10 is generally pulled from the roll 11 and directed through the device 30 by a drive mechanism in the downstream direction or path A, as shown in FIGS. 3 and 4, and the major surface of the film 10 preferably extends substantially longitudinally and transversely to the direction A.

In the preferred embodiment, the staging mechanism 40 includes a fixed roller 47, which is preferably positioned below the staging rollers 42,44, and guide roller 48, which is preferably positioned at level with the feed-assisting mechanism 50. The fixed roller 47 and guide roller 48 are positioned and configured to preferably guide the film 10 away from the supply roll 11 and steadily toward the feed-assisting mechanism 50, all the while keeping the film in constant tension. The guide roller 48 is also preferably positioned upstream relative to the feed-assisting mechanism 50 and inflation assembly 70 such that the guide roller 48 blocks any air expelled from the inflation assembly 70 from reaching the supply roll 11.

The feed-assisting mechanism 50 is preferably configured to direct and manipulate the film 10 within the device 30 just prior to and during inflation. The feed-assisting mechanism 50 is preferably configured for gripping the film 10, preferably at or adjacent to the second longitudinal edge 14 to bias the edge away from the first longitudinal edge 12 during inflation to improve airflow into the cushion cavities. Preferably, the feed-assisting mechanism 50 includes a tension member, such as a pair of tension rollers 52,54, positioned in the device 30 transversely opposite of the inflation assembly 70, and extending from the housing 32. The tension rollers 52,54 are preferably positioned substantially on top of each other such that the second longitudinal edge 14 of the film 10 can pass and be rolled therebetween as the film 10 is directed in the downstream direction A. In the preferred embodiment, the rollers 52,54 are preferably free-spinning, but in other embodiments, the two rollers can be associated with a drive mechanism to aid in driving the film downstream from the roll and through the inflation device.

The tension rollers 52,54 preferably extend from the housing 32 such that the rotational axis 55 of the rollers 52,54 is at an angle 56 from the orthogonal to the downstream direction A of the film 10 through the device 30. The angle 56 is preferably at least about 2° and at most about 20° from orthogonal, and as shown in FIG. 4, the angle 56 is from about 5° to about 10° from orthogonal. In this angled configuration, the rollers 52,54 pull the second longitudinal edge 14 of the film 10 away from the inflation assembly 70 as the film 10 passes and is rolled between the rollers 52,54 in the downstream direction A. By pulling the second longitudinal edge 14, and with the inflation channel 23 over the inflation nozzle of the inflation assembly, the first and second layers 20,22 of the film are substantially flat and taught during inflation. This unsticks the layers 20,22 from each other, which stickage can prevent or substantially impede the flow of air into the cushion cavities. The rollers 52,54 are especially useful in unsticking the film layers when the axes of the cushions are longitudinally oriented parallel to the longitudinal axis of the film, or when the film has other complex cushion patterns or orientations, Regardless of the orientation of the cushions, the unsticking of the film layers by the feed-assisting mechanism advantageously also allows inflation of the films at higher speeds, and inflation of films having thinner first and second film layers, which tend to be more sticky, while minimizing the necessary inflation pressure. The tension rollers 52,54 have been found to be particularly advantageous when used with narrow and deep inflation cavities, such as with inflation cavities that have a depth (in the lateral direction) of more than twice the width (in the longitudinal direction), or at least three or four times the width. In other embodiments, the tension rollers can be used with a different type of sealing mechanism, such as a linear sealing mechanism.

The inflation assembly 70 is preferably mounted to the housing 32 and positioned on a transversely opposite side from the feed-assisting mechanism 50. Additionally, the inflation assembly 70 is positioned within the device 30 such that it is generally aligned with first longitudinal edge 12 and the inflation channel 23 as the film 10 is directed through the device 30. The inflation assembly 70 is configured and oriented for inflating each cushion cavity 28 of the film 10 with a fluid, which is preferably a gas, and more preferably is air.

Figure 5:
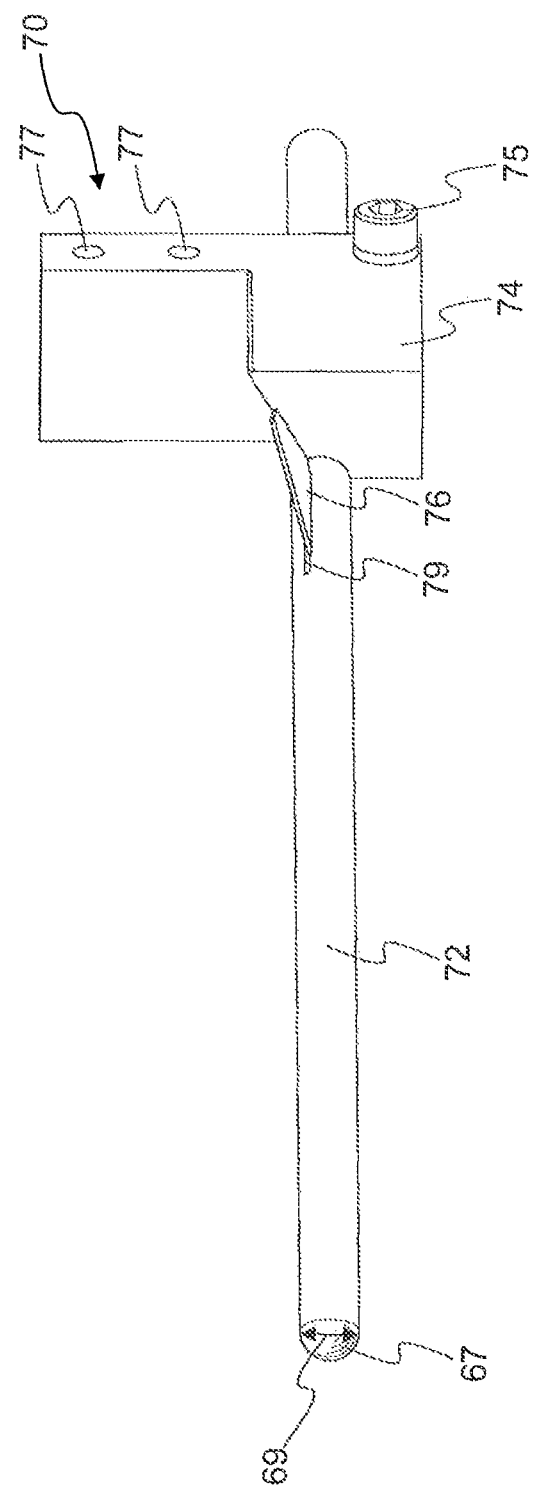
FIG. 5 is a perspective, left-rear view of a preferred embodiment of an inflation assembly of the present invention.
Figure 6:
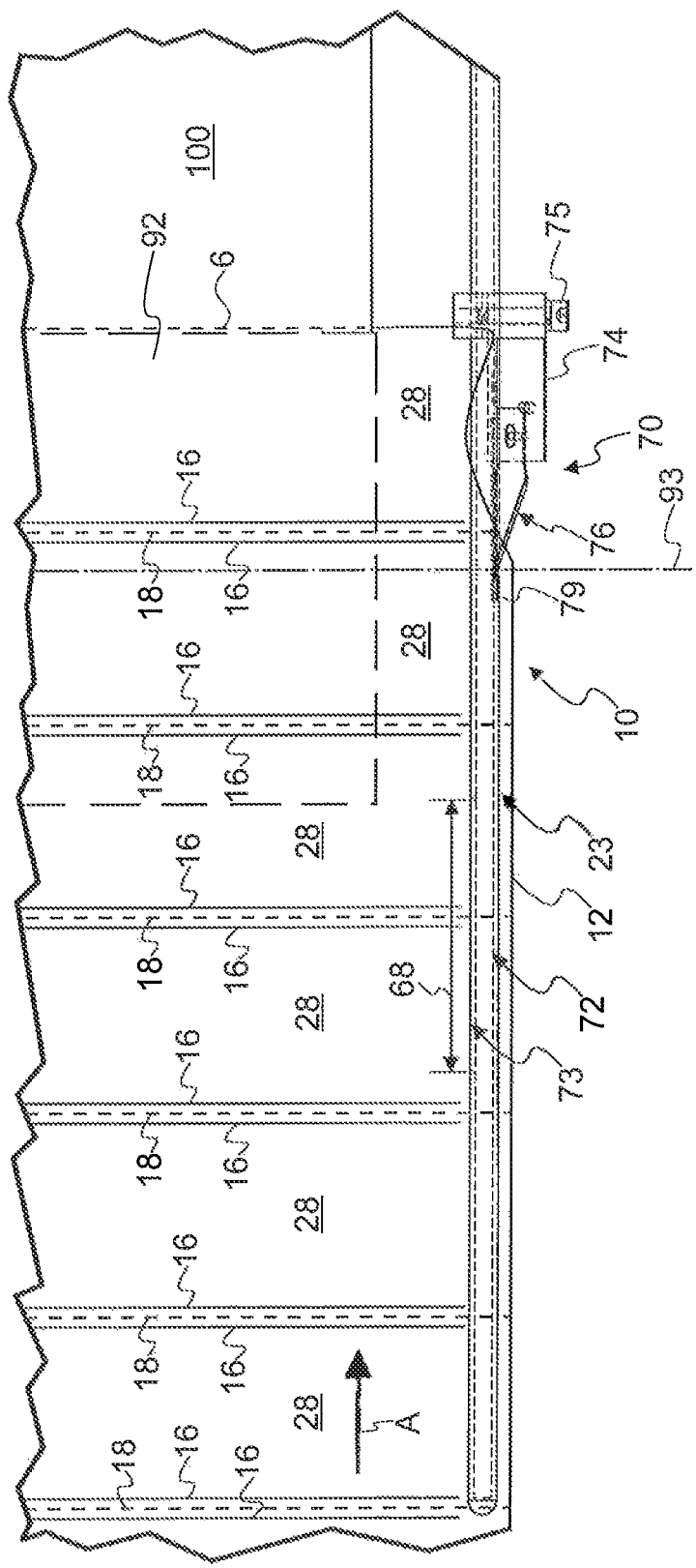
FIG. 6 is a bottom view thereof, showing the inflation pipe assembly associated with the inflation channel of the film of FIG. 1.
Figure 7:
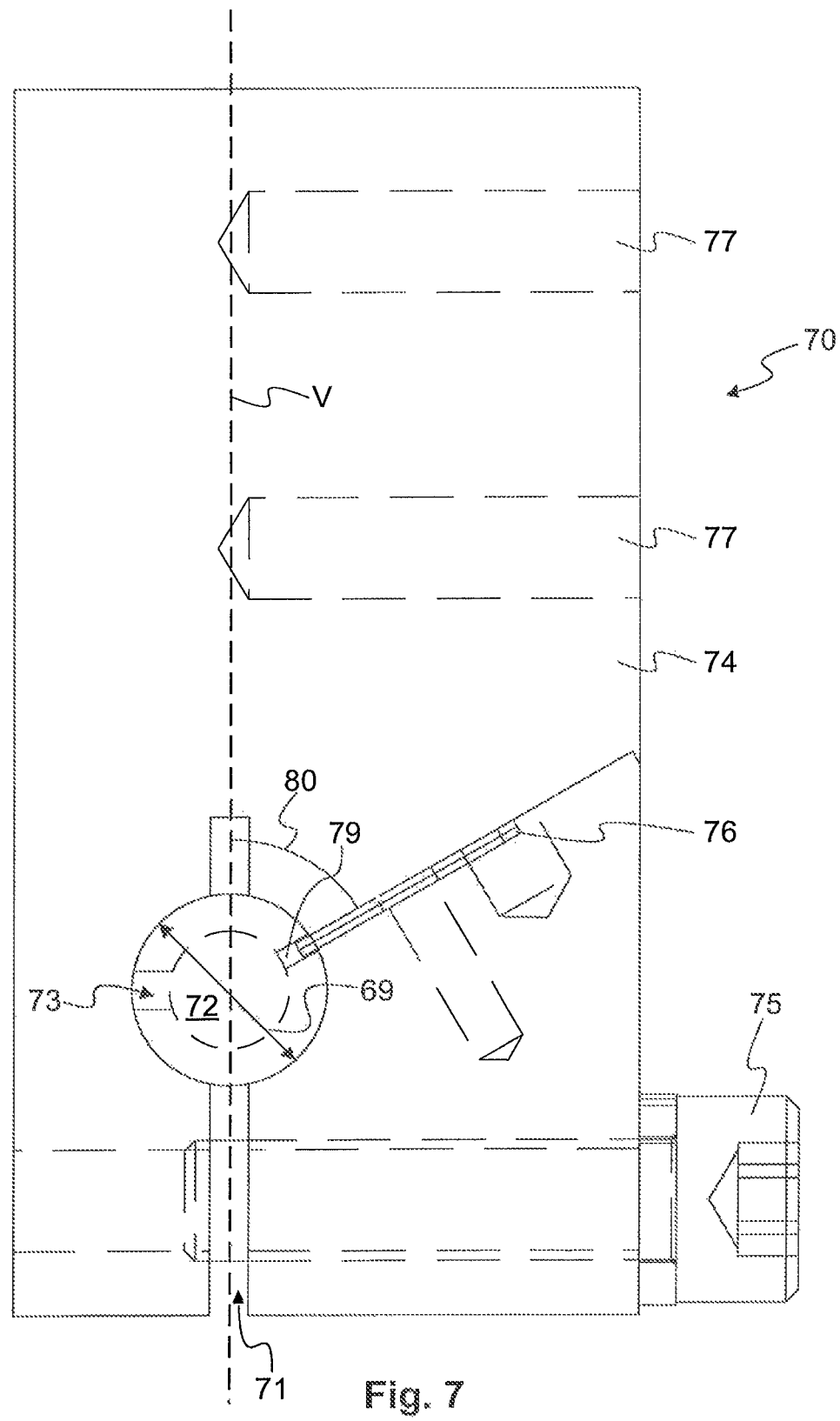
FIG. 7 is a rear view thereof.

As shown in FIGS. 5-7, the inflation assembly 70 preferably includes a fluid conduit or nozzle 72, which is preferably tubular and extends in a longitudinal direction that is generally parallel to the downstream direction A of the moving film 10. As shown in FIG. 7, the nozzle 72 is held within a gap 71 of the nozzle housing 74, and is secured therein, such as by fastener 75. The nozzle housing 74 is preferably secured to the device housing 32, and as shown in FIG. 7, the nozzle housing 74 is secured via a pair of openings 77 that are configured to receive fasteners. The device housing 32 preferably contains an air compressor 33 or other similar compressed fluid, gas, or air source, which is connected to the nozzle 72 for delivering inflation air therethrough. Other embodiments can secure the compressed air source in different configurations, which can include an external compressed air source.

The nozzle 72 is preferably aligned with the inflation channel 23 of the film 10. Preferably, the nozzle 72 has an outer diameter 69 that is configured for a tight, and more preferably friction-fitting, receipt within the inflation channel 23. More preferably, the outer diameter 69 is at least about 0.15 inches and at most about 0.75 inches, and is even more preferably at least about 0.25 inches and at most about 0.5 inches. In the preferred embodiment, the outer diameter 69 is about 0.30 inches. In other embodiments, however, the nozzle can be removed from the nozzle housing and replaced with a nozzle of a different outer diameter, depending on the configuration of the cushion and inflation channel of the film to be inflated. The nozzle 72 can also have a tapered configuration. The upstream nozzle tip 67 is preferably rounded, although in other embodiments, the nozzle tip can have other configurations, and the tip 67 is preferably positioned just downstream of the feed-assisting mechanism 50, on the opposite side thereof.

The nozzle 72 includes an outlet from which air is expelled to inflate the cushion cavities of the film 10. Preferably, the outlet is inflation slot 73 that runs along a portion of the longitudinal length of the nozzle 72, and is positioned to direct air substantially transversely into the cushion cavities. More preferably, the inflation slot 73 has a length 68 that is longer than the perforation-to-perforation length 18 of the film 10 to maximize the inflation efficiency of the air expelled from the inflation slot 73 and into the cushion cavities. Preferably, the cushions 28 are filled with air at an inflation pressure of at least about 3 psi, and more preferably at an inflation pressure of at least about 5 psi. In the preferred embodiment, the inflation pressure of the cushions 28 is between about 5 psi and about 8 psi, but other embodiments can inflate the cushions at even greater inflation pressures.

The inflation assembly 70 also includes a cutting element, which is preferably a blade 76. As shown in FIGS. 3-7, the blade 76 is preferably disposed and secured within a blade slot 79 that is defined in the tubular wall of the nozzle 72. The nozzle preferably has a tubular wall thickness that is at least about 0.01 inches and at most about 0.07 inches, and is more preferably is about 0.03 inches. Blade slot 79 is machined within the tubular walls preferably without creating or by minimizing leaks from the nozzle 72. The blade 76 is positioned along the nozzle 72 downstream from both the inflation slot 73 and first and second insertion idler rollers 92,94 of the sealing mechanism 90. Preferably, the blade 76 is positioned immediately downstream from the axis 93 of the insertion idler roller 92, is more preferably less than about ¼ inch downstream, and in the preferred embodiment. is about ⅛ inch downstream of the axis 93. In this configuration, the film 10 is firmly held by the sealing mechanism 90 prior to cutting the film 10 and releasing it from association with the inflation assembly 70. The blade 76 is also preferably positioned upstream from the sealing mechanism 90.

Additionally, the blade 76 is preferably disposed about the nozzle 72 on the opposite side from the inflation slot 73. Preferably, the blade 76 is substantially vertical or parallel with the vertical plane V (in embodiments in which the lateral width of the film is generally horizontal) that is orthogonal to the major surface of the film 10. The blade 76 can also be at an angle 80 from the vertical plane V, as best shown in FIG. 7. Preferably, the angle 80 is less than about 90° from the vertical plane V, and in the preferred embodiment, the angle 80 is from about 60° to about 70° from the vertical plane V. Put another way, the blade 76 is preferably disposed about the nozzle 72 from between about 12 o'clock and about 6 o'clock, and more preferably from between about 1 o'clock and about 2 o'clock when looking downstream. In this configuration, the blade 76 cuts the film 10 after inflation of the cushions 28 and nipping between the first and second insertion idler rollers 92,94. More preferably, the blade 76 cuts a portion of the first or second film layers 20,22 near or adjacent to the first longitudinal edge 12 of the film 10 (i.e. at or adjacent to the sealing or edge portion 8), as the film 10 is directed in the downstream direction A. By cutting a portion of the film 10, the inflation assembly 70 is released from association with the inflation channel 23 of the inflated film 10 (i.e. between the film layers 20,22), and can proceed through the rotary scheme of the sealing mechanism 90.

Optionally, the inflation mechanism can also include a film drag tension mechanism positioned immediately upstream of the insertion idler rollers of the sealing mechanism. For example, the film drag tension mechanism can be adjustable and include a felt material, preferably having dimensions of 1 inch×1 inch, that is configured to engage and flatten the film prior to engagement with the sealing mechanism. This prevents or substantially reduces the formation of any wrinkles in the film for easier subsequent sealing, and can improve the sealing of air about the nozzle.

The sealing mechanism 90 is positioned within the device 30 downstream of the inflation slot 73 of the inflation assembly 70 so that the cushions 28 of the film 10 are sealed after being inflated. Preferably, the sealing mechanism 90 includes an arrangement of rollers, belts, and drums that is configured to nip and hold the film 10 at a feeding zone 96, and to direct the film 10 in the direction or path A that is generally curved. The curved path is preferably defined by different segments or areas, including an intake segment, a sealing segment, and a cooling segment. The film 10 is directed through and around the intake, heating, and cooling segments before finally being released as a sealed film 10 at an exit zone 98 of the sealing mechanism 90. Preferably, the sealing mechanism 90 is substantially aligned with the inflation assembly 70 such that the film 10 is nipped and securely held along sealing or edge portion 8, which includes or is adjacent to the inflation channel 23 and first longitudinal edge 12. Preferably, the sealing mechanism 90 is configured for forming a substantially longitudinal seal 29 in the film 10, however, in other embodiments, the sealing mechanism can be configured for forming a seal that has a curved, zig-zag, or other orientation.

The sealing mechanism 90 preferably includes a feeding zone 96 where the sealing portion 8 is placed between first and second drive belts 100,102. Referring to FIG. 3, the first drive belt 100 is preferably driven in the belt direction B, and the second drive belt 102 is preferably driven in the belt direction C, such that the film is generally directed in the downstream direction A through the sealing mechanism 90 after being inserted and nipped at the feeding zone 96. The first and second drive belts 100,102 are preferably driven by respective first and second nip rollers 104,106, which are associated with drive mechanisms that preferably include a gear and motor system housed in the device housing 32 for each nip roller. Alternatively, both first and second nip rollers 104,106 can be driven by a single drive mechanism. In one embodiment, only one of the first and second nip rollers 104,106 is directly driven by a gear and motor system, while power is transferred to the other nip roller by another gear system. As shown in FIG. 10, each of the first and second nip rollers 104,106 preferably include raised edges 132 that define a belt groove therebetween. The raised edges 132 advantageously help maintain the first and second belts 100, 102 in the belt groove and in association with the nip rollers, even when the nip rollers are driven at high rotational speeds.

Figure 8:
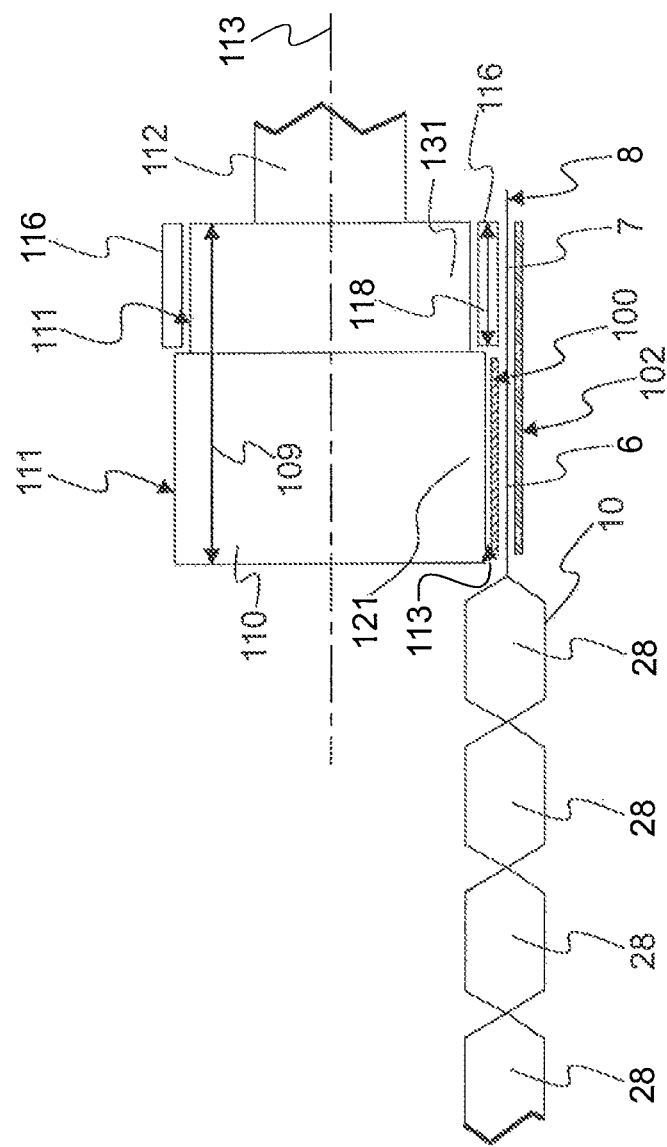
FIG. 8 is a schematic, rear view of a preferred embodiment of a sealing mechanism, showing the sealing mechanism associated with another embodiment of a film of cushions.

The first drive belt 100 preferably has a narrower transverse width than the second drive belt 102. This difference in transverse width allows a seal part 7 of the sealing portion 8 of the film 10 to be exposed and directly contacted by the heating element 116 of the sealing drum 110 during sealing, while the portion of the second drive belt 102 that extends past the first drive belt 100 pinches or presses the seal part 7 of the sealing portion 8 against the heating element 116 to form the seal. The portion of the second belt 102 that overlaps the first drive belt 100 preferably pinches a pinched part 6 of the sealing portion 8, which is preferably disposed transversely between the seal part 7 and the cushion cavities 28 as shown for example in FIG. 8, against the first drive belt 100 and sealing drum 110 sufficiently tightly to keep the fluid from escaping from the cushion cavities while the sealing portion 8 is directed to and around the sealing drum 110. The film 10 shown in FIG. 8 is exemplary of another embodiment of a film of cushions that can be used with device 30, the film 10 having cushions 28 with longitudinal axes that are parallel to the longitudinal axis of the film 10.

In the preferred embodiment, the width of the first drive belt 100 is at least about ¼ inch and at most about 1.0 inch, and more preferably is at least about ½ inch and at most about ¾ inch. In the preferred embodiment, the first drive belt 100 is about ⅝ inch wide. The second drive belt 102 preferably has a width that is similar to the width of the sealing portion 8 of the film 10. Preferably, the width is at least about ½ inch and at most about 1 and ½ inch, and more preferably is at least about 1.0 inch and at most about 1 and ¼ inch. In the preferred embodiment, the second drive belt 102 is about 1 and ⅛ inch wide. Other embodiments can use first and second drive belts having different transverse widths.

The first and second drive belts 100,102 preferably have a similar belt thickness of at least about 0.02 inches, and more preferably at least about 0.05 inches. In a preferred embodiment, the belts have a thickness of about 0.07 inches. Such belt thicknesses provide several advantages, including maintaining a sufficient stiffness of the belts 100,102 to ensure hold back and containment of the air within the inflated cushion cavities. The belt thickness also allows the belts 100,102 to properly track on the crowned rollers of the sealing mechanism 90, and minimizes the effect of the belts 100,102 on the drive pitch diameter.

The first and second drive belts 100,102 are preferably made of a relatively non-wearable material to promote extended life of the belts, preferably greater than 100 hours, before replacement. For example, the drive belts 100,102 can be made of TEFLON® or a silicon composite, or alternatively have a TEFLON® or silicon-laminated surface. More preferably, the second drive belt 102 has a SILAM K® silicone surface, for example as sold by Ammeraal Beltech, Inc., or similar surface that is able to withstand continuous 390° F. operating temperatures due to its proximity to the heating element of the sealing drum. Advantageously, this extends the life of the belt despite the increased temperatures applied to the belt to conduct heat to the film material, and/or the heat friction that results due to contact with the film material. Additionally, it was found that the surface of the first drive belt 100 works best if it has a smaller frictional coefficient or is relatively more slippery compared to the second drive belt 102 and the film 10 to allow the first drive belt to slip slightly as needed, such as when there are differences in the pitch diameter at the various rollers due to wrapping of the two drive belts 100,102 around a common roller.

The feeding zone 96 is located between the first and second insertion idler roller 92,94, which respectively guide the first and second drive belts 100,102 in their respective directions, and keep the belts in tension, around the sealing drum 110. Preferably, the first and second insertion idler rollers 92,94 are positioned substantially on top of each other, and more preferably, the rollers 92,94 are slightly offset from each other, with roller 92 positioned slightly upstream of roller 94 to provide a small amount of give between the drive belts 100,102 to receive the film 10 therebetween. Additionally, the insertion idler rollers 92,94 are preferably positioned downstream of the feed-assisting mechanism 50 such that the angle 95 is defined between the axis of rotation 93 of the roller 92 and the axis 97 (defined between the axis 93 at the end of the roller 92 and the axis of rotation 55 at the end of roller 52), as shown in FIG. 4, is at least about 30°, and is more preferably at least about 45°.

Due to the position of the first and second insertion idler rollers 92,94 at the feeding zone 96, the first and second drive belts 100,102 preferably come together to nip and receive the film 10, and pinch the first film layer 20 and the second film layer 22 against each other along the sealing portion 8 as the film 10 is directed in the downstream direction A. Pinching of the film layers 20,22 sufficiently tightly prevents air within the inflated cushion cavities from leaking during the rest of the sealing process. To provide a maximum pinching pressure between the belts 100,102 and the film layers 20,22, the spacing between the insertion idler rollers 92,94 is preferably minimized to at most about 0.40 inches, more preferably to at most about 0.30 inches, and in the preferred embodiment to about 0.25 inches.

After being nipped and pinched between the first and second drive belts 100,102 at the feeding zone 96, the film 10 is directed along the intake segment 117 of the path A, which is preferably curved, and more preferably curved in a direction away from a plane that extends longitudinally and transversely away from the nozzle 72. The intake segment is preferably defined as the length of the path A downstream of the feeding zone 96 and upstream of the beginning of the sealing segment 115. Preferably, the length of intake segment 117 is at least greater than a quarter of the surface circumference, is more preferably at least greater than half of the surface circumference, and is even more preferably at least greater than double the surface circumference of the insertion idler roller 94. Preferably, the blade 76 is located at or adjacent to the intake segment 117 so that the sealing portion 8 is cut substantially immediately after being nipped and pinched at the feeding zone 96.

After being cut, the film 10 is directed to the sealing segment 115 of the sealing mechanism 90, which includes a rotary sealing drum 110. The sealing drum 110 is positioned downstream and preferably generally below the first and second insertion idler rollers 92,94 within the device 30. As is shown more clearly in the embodiments of FIGS. 8 and 9, the sealing drum 110 is preferably substantially cylindrical in shape, and includes a circumferential outer surface 111 that is substantially smooth. The sealing drum 110 has a transverse width 109 that is approximately the same as both the width of the second drive belt 102 and the sealing portion 8 of the film 10.

The sealing drum 110 is in association with a rotary axle 112 that is configured for rotating the sealing drum 110 about axis 113. The rotary axle 112 is preferably associated with a drive mechanism 114 that is configured to rotate the axle 112, the drive mechanism including a gear and motor system that is preferably contained in the device housing 32. In other embodiments, the device does not include a drive mechanism configured to rotate the sealing drum, and the drum is instead dependent on the association with the drive belts for rotation.

The sealing drum 10 includes a sealing portion, which is preferably heating source or element 116 that is disposed adjacent a belt supporting portion 121 of the outer surface 111, and is longitudinally aligned with the sealing portion 8 of the film. More preferably, the heating element 116 is mounted to or adjacent the outer surface 111 of a heating element supporting portion 131. The transverse width of the belt supporting portion 121 is preferably greater than the width of the heating element support portion 131, but in other embodiments, the widths can be of varying proportion. Preferably, the heating element 116 can heat up to, or cool down from, the desired sealing temperature in less than about 8 seconds, more preferably in less than about 5 seconds, and in the preferred embodiment, in less about 2-3 seconds. This allows the device 30 to be started and stopped without an unnecessarily long start/stop sequence. The heating element 116 also preferably continuously powered or heated to maintain a sealing temperature throughout the sealing process. Preferably, the sealing temperature of the heating element is at least about 300° C. and at most about 500° C., is more preferably at least about 350° C. and at most about 425° C., and in the preferred embodiment is about 390° C. The heating element 116 is configured for associating with, and preferably positioned so that it directly contacts, the seal part 7 of the sealing portion 8 that is to be sealed, and then transferring heat to the sealing portion 8 to melt or otherwise close and seal the film 10. The surface of the heating element 116 is preferably substantially smooth and continuous such that it produces a seal with no gaps or pockets that would allow air to escape from the cushion cavities. The heating element 116 preferably has a width 118 that is at least about 1/10 inch and at most about 1.0 inch, is more, preferably at least about 1/4 inch and at most about 3/4 inch, and in the preferred embodiment is about 1/2 inch.

The heating element 116 can include resistance sealing wires that are integrated in the sealing drum to achieve its heating properties. In one embodiment, each wire has a diameter of about 0.015 inches, and is made of an alloy that is about 80% nickel and about 20% chromium. A series of holes, preferably each about 0.06 inches in diameter, is drilled and spaced apart, preferably about 1.0 inch, around the sealing drum. The resistance wires are bent down into each hole at a depth of about 0.12 inches, and the remainder length of the wires lay across the surface of the sealing drum between the holes, which creates a stitched seal pattern. The resistance wires are preferably bonded into the holes to keep the wires in place. This allows the wires to expand and retract as their temperatures change. The series of wires can be spaced parallel from each other across the surface of the sealing drum, and the holes of one wire can be drilled out of phase with those of an adjacent wire. In other embodiments, the heating element can include a thermocouple feedback or non-contact infrared temperature sensor to provide feedback to a programmable logic controller to monitor the real-time temperature of the heating element.

In another embodiment, the heating element 116 can be a custom "thin film" heater, such as one produced by Minco Corp. Such a heater uses thin, resistance alloy etching that is bonded to KAPTON®, for example as sold by Dupont, and attached to aluminum foil. This technology also allows an integrated thermocouple to provide temperature feedback to a programmable logic controller.

In yet another embodiment, the heating element 116 can include traditional resistance heaters, such as FIREROD® cartridge heaters, for example as sold by Watlow Electric Manufacturing Co.; flexible, silicon rubber-based heaters; or the like. Such heaters, however, are not as desirable due to their relatively slow heating properties.

Figure 9:
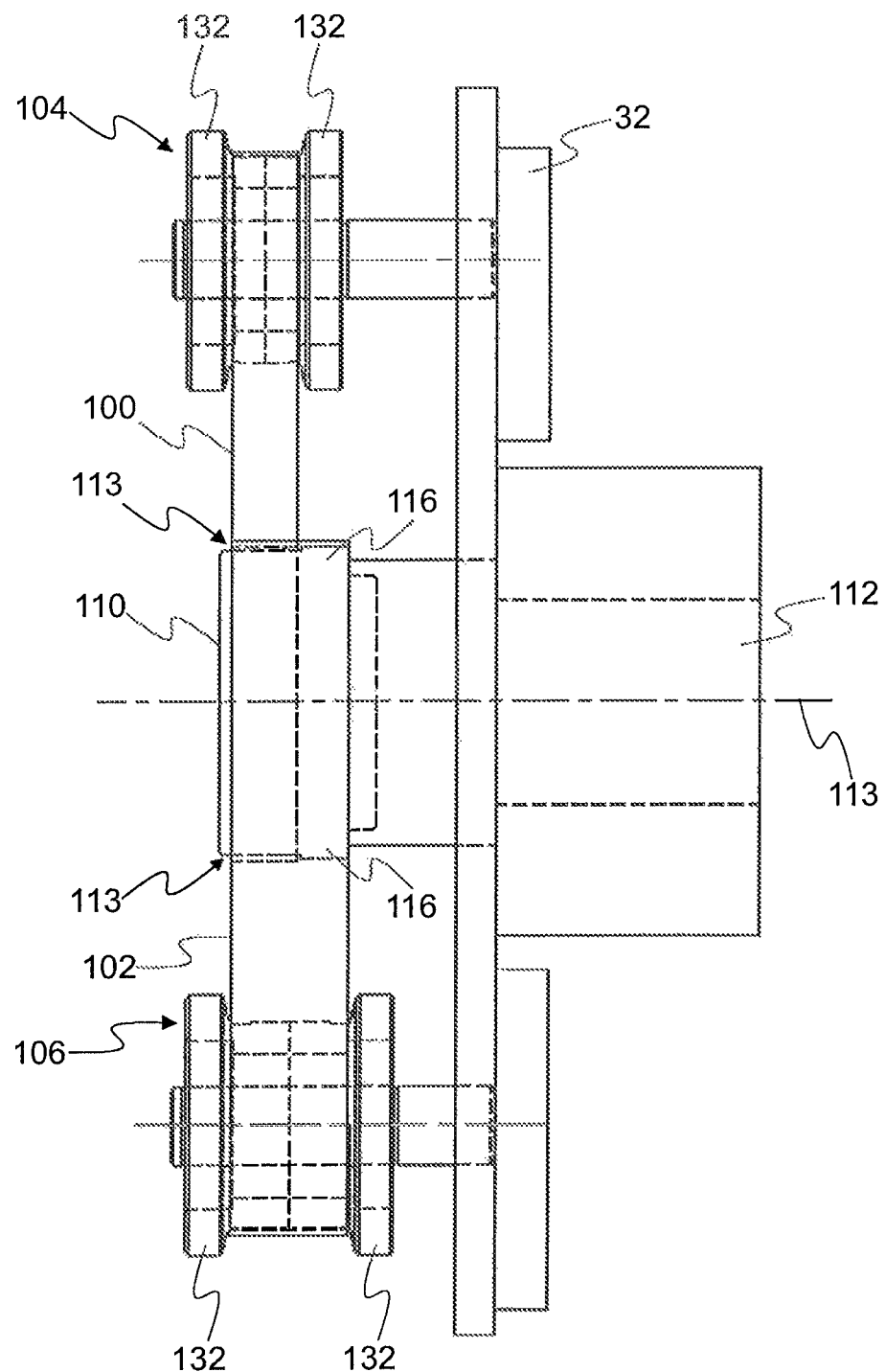
FIG. 9 is another schematic, rear view thereof.

The sealing drum 110 is configured for association with both the first drive belt 100 and the second drive belt 102, which is wider than the first drive belt 100, about its outer surface 111. As shown in FIGS. 8 and 9, the first drive belt 100 preferably directly contacts the surface 111 of the belt support portion 121 of the sealing drum 110 in a recessed area 113 that is adjacent the heating element 116. In this configuration, the outer surfaces of the first drive belt 100 and the heating element 116 are substantially flush and level. The sealing portion 8 of the film 10, which is pinched between the first and second drive belts 100,102, preferably contacts both the first drive belt 100 and the surface of the heating element 116 on one of its sides, and preferably contacts the entire width of the second drive belt 102 on its other side. The second drive belt 102 presses the exposed seal part 7 of the sealing portion 8 against the heating element 116 so that heat transfer thereto is maximized and the seal part 7 is sealed. The amount of sealing pressure applied to the sealing portion 8 can be adjusted, for example by varying the depth of the recessed area 113 so that height of the first drive belt 100 is lowered or raised relative to the surface of the heating element 116.

In this configuration, formation of a seal in the seal part 7 of the sealing portion 8 is achieved as the sealing portion 8 is direct through the sealing segment 115 and brought in contact around the rotating sealing drum 110 by the first and second drive belts 100,102. Preferably, the sealing drum 110 and the other rollers of the sealing mechanism 90 are configured such that contact between the sealing portion 8 and the heating element 116 of the sealing drum 110 along the sealing segment 115 is maximized during sealing. The sealing segment 115 is preferably curved, the length of the sealing segment 115 being defined by the contact of the belts 100,102 around the circumference or periphery of sealing drum 110. The circumference of the sealing drum 110 is preferably at least 6 inches, is more preferably at least about 9 inches, and is even more preferably at least about 15 inches. In one embodiment, the drive belts 100,102 are positioned to maintain contact between the sealing portion 8 and at least about 40% of the circumference of the sealing drum 110, more preferably at least about half of the circumference, and still more preferably at least about 60% of the circumference, even more preferably at least about three-quarters of the circumference. In other embodiments, the belts are preferably positioned to maintain contact between the sealing portion and at least 80%, and more preferably at least 90%, of the circumference of the sealing drum. In the preferred embodiment, the sealing portion 8 contacts about 90% of the circumference of the sealing drum 110 during sealing. Additionally, the heating element 116 preferably maintains a constant sealing temperature about at least 40%, preferably about at least half, more preferably about at least three-quarters, and even more preferably about the entire circumference or periphery of the sealing drum 110. Advantageously, the amount of contact between the belts and the drum, and the constant sealing temperature of the heating element, maximize the sealing dwell time and also minimizes the time that the heating element 116 is exposed to ambient air, which can cause overheating and damage to the heating element and/or nearby film material. Additionally, the continuously-heating feature of the heating element 116 preferably produces a continuous seal with no unsealed parts or gaps that would allow air to escape from the cushion cavities.

After sealing by the sealing drum 110, the drive belts 100,102 direct the film 10 and the sealing portion 8 through the cooling segment 119 of path A of the sealing mechanism 90. The cooling segment 119 is preferably separate from the sealing segment 115 and the sealing drum 110, and the cooling segment 119 is also preferably curved, its length being defined by its travel around and between a set of three additional cooling rollers 120,122,124. As seen in FIG. 3, roller 120 reverses the curvature of the path in the cooling segment 119, compared to the curvature, of the path about the sealing drum, shortly after leaving the sealing segment 115. This, provides a curvature in a different or opposite direction from that about the sealing drum 110, and allows the curvature in alternating directions in the sealing and cooling segments 115,119. The rollers 120,122,124 are preferably configured to help maintain the first and second belts 100,102 in tension about the sealing drum 110. Rollers 120,122 are positioned to pinch the drive belts 100,102 and the film 10 therebetween. Rollers 122,124 are offset from each other, as best seen in FIG. 3, to reduce the pressure on the film layers 20,22, which are sealed and cooled by the time they reach roller 124, and dispense the strand of sealed cushions from the device 30 at exit zone 98. As the film 10 makes its way through the cooling segment 119, the first and second drive belts 100,102 continue to pinch the sealing portion 8 and hold back the air contained in the cushions while the seal cools. By keeping the drive belts 100,102 in a curved path around the rollers 120, 122,124, the belts are kept taut and under increased tension against each other and the sealing portion 8 of the film 10 to hold back the air before the film layers 20,22 are sealed and sufficiently cool to hold back the air without assistance. Additionally, maximizing the cooling dwell time in the cooling segment 119, while at the same time using the drive belts 100,102 to hold back the air, ensures proper formation of the seal with an appropriate and desired seal integrity, even at increased inflation pressures as high as about 5 psi to about 8 psi or greater, upon exiting the sealing mechanism 90 at the exit zone 98.

To provide a maximum pinching pressure between the belts 100,102 and the film layers 20,22 as they pass through the cooling segment 119, the spacing between the cooling rollers 120,122,124 is preferably minimized to at most about 0.40 inches, more preferably to at most about 0.30 inches, and in the preferred embodiment to about 0.25 inches. Additionally, the drive belts 100,102 are preferably kept at a tension in the cooling segment 119 sufficient to hold back the air in the inflated cushions, but preferably this tension is minimized while still holding back the air. Preferably, the tension of the drive belts less than about 8 lbs., but is at least about 2 lbs, and is more preferably at least about 4 lbs. In the preferred embodiment, the tension of the drive belts is about 5 lbs. In one embodiment, a cooling device 125, such as a fan or blower, can be directed at the cooling segment to increase the rate of cooling of the seal, and in another embodiment, this cooling device is not present.

In the preferred embodiment, inflation of the cushions of film 10 is initiated by turning on a power source of the device 30, which controls the drive mechanisms for the nip rollers and sealing drum, the air compressor 33, and the heating element 116. The lead end 6 of the film 10 is then manually extended from the roll 11, and directed about the rollers 47,48 of the staging mechanism 40. The first longitudinal edge 12 of the film 10 is fed between the rollers 52,54 of the feed-assisting mechanism 50, and the inflation channel 23 on the opposite side of the film 10 is fed over the nozzle 72 of the inflation assembly 70 through the lead opening 24. The lead end 6 is then manually directed to the feeding zone 96 of the sealing mechanism 90, where the sealing portion 8 of the film is nipped and pinched between the first and second drive belts 100,102 and directed through the remainder of device 30.

Once the film 10 is inserted between the drive belts 100, 102, the remainder of the manufacturing process is automated, as the film 10 is continuously pulled from the supply roll 11 by the drive belts 100,102, and directed past the different mechanisms of the device for inflation by the nozzle 72, cutting by the blade 76, and sealing by the heating member 116. Due to the advantages described above, the device 30 can inflate and seal the film 10 at an increased rate compared to prior art devices, which is preferably at least about 50 ft/min, is more preferably at least about 70 ft/min, and is even more preferably at least about 100 ft/min. The device 30 achieves such production while advantageously only requiring standard power utility requirements, such as by being capable of plugging into a standard wall outlet of 120 or 240 VAC, and 15 amp. The device 30 does not require excessive inflation pressure for inflating the cushion cavities, but the device 30 can inflate and properly seal cushions at higher pressures, for example, due at least in part to the curved path of the drive belts 100,102 and film 10 through the cooling segment 119 of the sealing mechanism 90.

Other advantages of the device include the fact that the sealing mechanism can form seals in a variety of film materials, the drive belts have an extended life before requiring replacement, the various parts (e.g. the belts, blade, sealing drum/rollers, and nozzle) are easily replaceable, and the device is relatively simple to control and the film is easily threaded therein.

All of the references specifically identified in the detailed description section of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. An inflatable-cushion inflation and sealing device, comprising:
    an inflation assembly configured for inflating with a fluid a cushion cavity disposed between first and second layers of a film; and
    a sealing mechanism comprising a rotary sealing drum that comprises a periphery and a heat source providing heat to substantially the entire periphery, the sealing mechanism configured for receiving overlapping portions of the first and second film layers adjacent the inflated cushion cavity, and directing the overlapping portions about the sealing drum to hold the overlapping portions against each other sufficiently tightly to keep the fluid from escaping from between the overlapping portions and to seal the overlapping portions to each other using the heat source over a heating portion of the sealing drum periphery to form a longitudinal seal configured to seal the fluid in the cushion cavity, wherein the heat source is configured to maintain a temperature around substantially the entire periphery that is sufficient to seal the overlapping portions to each other.

2. The inflation and sealing device of claim 1, wherein:
    the film has a major surface extending longitudinally and transversely to an inflation path;
    the overlapping portions are joined together;
    the inflation assembly comprises a fluid conduit configured for reception longitudinally between the joined overlapping portions; and
    the device comprises a blade, wherein the sealing mechanism is configured so that film is drawn along a path, which is curved away from the blade to pull the film against the blade to facilitate cutting open the inflation channel for extraction of the fluid conduit therefrom, such that the blade is disposed on an outside of the curve with respect to the inflation conduit.

3. The inflation and sealing device of claim 1, further comprising first and second tension rollers disposed on a transversely opposite side of the film from the overlapping portions and configured for gripping an opposite edge of the film, the tension rollers being oriented at an angle to a direction transverse to an inflation path to bias said opposite edge away from the overlapping portions to improve airflow into the cushion cavity.

4. The inflation and sealing device of claim 1, wherein the heat source is configured to provide substantially continuous heat sufficient to seal the overlapping portions.

5. The inflation and sealing device of claim 1, wherein the sealing mechanism comprises at least one belt in tension around the sealing drum to press the overlapping portions against the sealing drum and each other for longitudinally sealing the overlapping portions.

6. The inflation and sealing device of claim 1, wherein the sealing mechanism includes first and second belts configured and disposed for nipping therebetween overlapping portions of the first and second film layers adjacent the inflated cushion cavity to keep the fluid from escaping from between the portions and directing the portions about a path against the sealing drum to heat the portions sufficiently to seal the portions for sealing the fluid in the cushion cavity.

7. The inflation and sealing device of claim 6, wherein:
    the drum has a belt supporting portion and sealing portion, the heat source being disposed in the sealing portion;
    the first belt is disposed between the second belt and the belt supporting portion, and has a first width transverse to the path; and
    the second belt has a second width transverse to the path and wider than the first width and disposed to pinch a pinched part of the overlapping portions against the first belt and to pinch a sealed part of the overlapping portions against the sealing portion of the sealing drum.

8. The inflation and sealing device of claim 7, wherein the pinched part of the overlapping portions is disposed transversely between the longitudinally sealed part of the overlapping portions and the cushion cavity.

9. The inflation and sealing device of claim 1, wherein the heating portion of the sealing drum periphery is at least about 50% of the drum periphery.

10. An inflatable-cushion inflation and sealing device, comprising:
    an inflation assembly configured for inflating with a fluid a cushion cavity disposed between first and second layers of a film; and
    a sealing mechanism, comprising:
        first and second belts configured and disposed for nipping therebetween overlapping portions of the first and second film layers adjacent the inflated cushion cavity to keep the fluid from escaping from between the overlapping portions and directing the overlapping portions about a curved path, and a heating element disposed along a curved portion of the curved path and operable to heat the overlapping portions sufficiently to seal the overlapping portions for sealing the fluid in the cushion cavity;

wherein the first and second belts are configured such that the path comprises:

a sealing segment in which the belts hold the overlapping portions in association with the heating element to seal the overlapping portions and direct the overlapping portions along a curve that has a curvature; and a cooling segment, downstream of the sealing segment, in which the belts direct the sealed overlapping portions away from the heating element along a curve that has a curvature in a different direction than the curvature of the sealing segment to allow the seal to cool sufficiently to retain the fluid unassisted;

wherein the belts pinch the overlapping portions together to keep the fluid from escaping from the cushion cavity in each of the sealing and cooling segments.

11. The inflation and sealing device of claim 10, wherein the path is curved in alternating directions along each of the sealing and cooling segments.

12. The inflation and sealing device of claim 11, wherein the belts are configured such that the path comprises an intake segment upstream from the sealing segment, in which the belts pinch the overlapping portions in an unsealed state to keep the fluid from escaping from the cushion cavity.

13. The inflation and sealing device of claim 10, wherein the path is curved in a first direction in the sealing segment and in an opposite direction in the cooling segment.

14. The inflation and sealing device of claim 10, further comprising a sealing drum that includes the heating element, the first and second belts configured for directing the overlapping portions about the sealing drum along a curved portion of the path in the sealing segment to hold the overlapping portions against each other to keep the fluid from escaping from between the overlapping portions and to seal the overlapping portions to each other.

15. The inflation and sealing device of claim 14, wherein:
the sealing drum has a belt supporting portion and sealing portion that is configured for longitudinally heat sealing the overlapping portions together;
the first belt is disposed between the second belt and the belt supporting portion, and has a first width transverse to the path; and
the second belt has a second width transverse to the path and wider than the first width and disposed to pinch a pinched part of the overlapping portions against the first belt and to pinch a sealed part of the overlapping portions against the sealing portion of the sealing drum.

16. The inflation and sealing device of claim 10, further comprising rollers that direct the belts along the path and define the curvatures.

17. The inflation and sealing device of claim 10, wherein the belts are configured to pinch the overlapping portions to keep the fluid from escaping from the cushion cavity between the sealing and cooling segments.

18. The inflation and sealing device of claim 10, further comprising a cutter configured and disposed for cutting the overlapping portions in the intake segment after the first and second belts nip the overlapping portions therebetween.

19. A method of inflating and sealing an inflatable cushion, comprising:
inflating a cushion cavity with a fluid, the cavity disposed between first and second layers of a film;
directing overlapping portions of the first and second film layers adjacent the inflated cushion cavity about at least 40% of a periphery of a rotary sealing drum to hold the overlapping portions against each other sufficiently tightly to keep the fluid from escaping from between the overlapping portions; and
using a heat source providing heat around substantially the entire periphery of the sealing drum to form a longitudinal seal configured to seal the fluid in the cushion cavity, wherein the heat source is configured to maintain a temperature around substantially the entire periphery that is sufficient to seal the overlapping portions to each other.

20. The method of claim 19, wherein heat source provides heat continuously around substantially the entire periphery of the sealing drum.

21. The method of claim 19, further comprising:
nipping the overlapping portions of the first and second film layers adjacent the inflated cushion between first and second belts to keep the fluid from escaping from between the portions; and
directing the nipped overlapping portions along a path against the sealing drum to form the longitudinal seal by moving the belts.

22. The method of claim 21, wherein:
the drum has a belt supporting portion and sealing portion, the heat source being disposed in the sealing portion;
the first belt is disposed between the second belt and the belt supporting portion, and has a first width transverse to the path; and
the second belt has a second width transverse to the path and wider than the first width and disposed to pinch a pinched part of the overlapping portions against the first belt and to pinch a sealed part of the overlapping portions against the sealing portion of the sealing drum.

23. The method of claim 22, wherein the pinched part of the overlapping portions is disposed transversely between the longitudinally sealed part of the overlapping portions and the cushion cavity.

24. The method of claim 21, wherein the first and second belts are configured such that the path comprises:
a sealing segment in which the belts hold the overlapping portions in association with the heating element to seal the overlapping portions and direct the overlapping portions along a curve that has a curvature; and
a cooling segment, downstream of the sealing segment, in which the belts direct the sealed overlapping portions away from the heating element along a curve that has a curvature in a different direction than the curvature of the sealing segment to allow the seal to cool sufficiently to retain the fluid unassisted.

25. The method of claim 24, wherein rollers are provided to direct the belts along the path and define the curvatures.

* * * * *